United States Patent
Ohshima et al.

(10) Patent No.: US 10,220,377 B2
(45) Date of Patent: Mar. 5, 2019

(54) METAL COLLOIDAL SOLUTION AND METHOD FOR PRODUCING THE SAME

(71) Applicant: Tanaka Kikinzoku Kogyo K.K., Tokyo (JP)

(72) Inventors: Yuusuke Ohshima, Ibaraki (JP); Hitoshi Kubo, Ibaraki (JP); Tomoko Ishikawa, Ibaraki (JP); Noriaki Nakamura, Ibaraki (JP); Junichi Taniuchi, Ibaraki (JP); Yoshiteru Tsuchiya, Ibaraki (JP); Hiroaki Takahashi, Kanagawa (JP); Hidenori Takanezawa, Ibaraki (JP); Kenichi Inoue, Ibaraki (JP); Syunsuke Kato, Ibaraki (JP); Hirokazu Shiraishi, Kanagawa (JP)

(73) Assignee: TANAKA KIKINZOKU KOGOY K.K., Tokyo (JP)

( * ) Notice: Subject to any disclaimer, the term of this patent is extended or adjusted under 35 U.S.C. 154(b) by 452 days.

(21) Appl. No.: 14/370,392

(22) PCT Filed: Feb. 8, 2013

(86) PCT No.: PCT/JP2013/053029
§ 371 (c)(1),
(2) Date: Jul. 2, 2014

(87) PCT Pub. No.: WO2013/118860
PCT Pub. Date: Aug. 15, 2013

(65) Prior Publication Data
US 2014/0357470 A1     Dec. 4, 2014

(30) Foreign Application Priority Data
Feb. 9, 2012    (JP) ................. 2012-025990

(51) Int. Cl.
| | |
|---|---|
| B22F 1/00 | (2006.01) |
| B22F 9/24 | (2006.01) |
| B01J 31/26 | (2006.01) |
| B01J 31/28 | (2006.01) |
| B01D 61/14 | (2006.01) |
| B01J 13/00 | (2006.01) |
| B01J 31/30 | (2006.01) |
| B82Y 30/00 | (2011.01) |
| B82Y 40/00 | (2011.01) |

(52) U.S. Cl.
CPC .......... *B01J 31/30* (2013.01); *B01D 61/145* (2013.01); *B01J 13/0039* (2013.01); *B01J 13/0043* (2013.01); *B01J 31/26* (2013.01); *B01J 31/28* (2013.01); *B22F 1/0062* (2013.01); *B22F 9/24* (2013.01); *B22F 2001/0092* (2013.01); *B82Y 30/00* (2013.01); *B82Y 40/00* (2013.01)

(58) Field of Classification Search
CPC ... B01J 31/30; B01J 31/28; B01J 31/26; B01J 13/0039; B01J 13/0043; B22F 1/0062; B22F 9/24; B22F 2001/0092; B01D 61/145
USPC ....................................................... 516/5, 97
See application file for complete search history.

(56) References Cited

U.S. PATENT DOCUMENTS

| | | | |
|---|---|---|---|
| 9,290,524 B2 * | 3/2016 | Zhang | ................ C01B 31/043 |
| 2001/0036592 A1 * | 11/2001 | Hoshi | ................ B41C 1/1041 |
| | | | 430/270.1 |
| 2007/0082812 A1 * | 4/2007 | Saito | ................ B01J 23/38 |
| | | | 502/302 |
| 2008/0146680 A1 | 6/2008 | Sato | |
| 2010/0078208 A1 * | 4/2010 | Inoue | ................ H05K 3/246 |
| | | | 174/261 |
| 2010/0078209 A1 * | 4/2010 | Inoue | ................ H05K 3/125 |
| | | | 174/261 |
| 2010/0101637 A1 | 4/2010 | Yamasaki et al. | |

FOREIGN PATENT DOCUMENTS

| | | |
|---|---|---|
| JP | 4-121692 A | 4/1992 |
| JP | 2000-087248 A | 3/2000 |
| JP | 2006-055748 A | 3/2006 |
| JP | 2008-214691 A | 9/2008 |
| JP | 2009-197324 A | 9/2009 |
| JP | 2009-228067 A | 10/2009 |
| JP | 2011-208274 A | 10/2011 |
| WO | 2006-082996 A1 | 8/2006 |

(Continued)

OTHER PUBLICATIONS

Isabel Pastoriza-Santos and Luis M. Liz-Marzán, Synthesis of Silver Nanoprisms in DMF, Nano Lett., vol. 2, No. 8, 2002, pp. 903-905 (Published on Web Jul. 19, 2002).*

(Continued)

*Primary Examiner* — Daniel S Metzmaier
(74) *Attorney, Agent, or Firm* — Roberts & Roberts, LLP

(57) ABSTRACT

The present invention is a metal colloid solution comprising: colloidal particles consisting of metal particles consisting of one or two or more metal(s) and a protective agent bonding to the metal particles; and a solvent as a dispersion medium of the colloidal particles, wherein: a chloride ion concentration per a metal concentration of 1 mass % is 25 ppm or less; and a nitrate ion concentration per a metal concentration of 1 mass % is 7500 ppm or less. In the present invention, adsorption performance can be improved with adjustment of the amount of the protective agent of the colloidal particles. It is preferable to bind the protective agent of 0.2 to 2.5 times the mass of the metal particles.

15 Claims, No Drawings

(56) References Cited

FOREIGN PATENT DOCUMENTS

WO    2010/100107  A2    9/2010
WO    2010/100107  A3    9/2010

OTHER PUBLICATIONS

Chou et al., "Effect of polyvinyl pyrrolidone molecular weights on the formation of nanosized silver colloids", Materials Chemistry and Physics 83 (2004) 82-88.*
Pastoriza-Santos et al., "Formation of PVP-Protected Metal Nanoparticles in DMF", Langmuir 2002, 18, 2888-2894.*
WPI—Abstract 2009-P41047, regarding reference JP 2009-228067 (JP2008/075305), 2 pages, (JP 2009228067 Publ. date Oct. 2009).

* cited by examiner

METAL COLLOIDAL SOLUTION AND METHOD FOR PRODUCING THE SAME

FIELD OF THE INVENTION

The present invention relates to a metal colloid solution, and especially relates to a metal colloid solution having excellent stability, in which dissolution of metal ion from colloidal particles hardly occurs over a long period.

DESCRIPTION OF THE RELATED ART

Application of metal colloid to the production of materials of a variety of fields such as a catalyst, an optical material, an electrical material and a magnetic material has been studied. Metal colloid means a state where solvent-insoluble fine metal particles (cluster particles) of 1 to 100 nm are dispersed or suspended in a solvent, and there is generally known a form of a metal colloid solution in which metal particles are dispersed in a liquid solvent. The reason why metal colloid is used in the above application is that fine particles can be bound to an arbitrary support in a suitable dispersion state. For example, in a catalyst field, for enhancing activity and ensuring durability, control of a particle size of a catalytic metal on a carrier becomes a task, but it is possible to meet this requirement when metal colloid is used.

Then, the other reason why metal colloid is suitable as a precursor of various materials is that metal colloid can bind alloy particles composed of a plurality of metals to a support while its composition is adjusted. Further, metal colloid is easy to adjust composition of metal particles in its producing process and can be supported on the carrier as it is, and therefore metal colloid has an advantage that catalyst particles having desired composition can be formed.

A method of producing a metal colloid solution generally comprises a step of dissolving a metal compound (metal salt) constituting metal particles in a solvent and then adding a reducing agent and a protective agent. In this step, the metal salt dissolved in a solvent becomes a metal ion, and the metal ion is reduced with a reducing agent to be a metal atom, and the metal atom agglomerates to form cluster particles to which a protective agent is bound to form colloidal particles. The protective agent is a compound that can be chemically or physically bound to the periphery of cluster particles and that can physically suppress aggregation among nanoparticles to provide stabilization (hereinafter, the particles in which the cluster particles are bound to a protective agent are referred to as colloidal particles.). A polymer organic compound such as polyvinyl pyrrolidone and polyethylene imine are most often applied as the protective agent. Further, in forming colloidal particles of an alloy, colloidal particles having desired composition can be produced with simultaneous or stepwise use of a metal salt of the constituent metal at a proportion taking a desired composition into consideration.

PRIOR ART DOCUMENTS

Patent Literature

[Patent Literature 1] Japanese Patent Application Laid-Open No. 2000-087248

[Patent Literature 2] Japanese Patent Application Laid-Open No. 2006-055748

SUMMARY OF THE INVENTION

Problems to be Solved by the Invention

As described above, it has been considered that colloidal particles are in a stable state with the action of a protective agent and are dispersed in a solvent while the metal content of the colloidal particles is maintained. However, the present inventors have confirmed that temporal change of colloidal particles occurs in a conventional metal colloid solution and thereby the metal content changes slightly. The present inventors have thought that the main reason for the temporal change of colloidal particles is dissolution (reionization) of a metal in the colloidal particles. Such a problem of the temporal change of colloidal particles has not been often pointed out so far. This is considered because a metal ion dissolved from colloidal particles is adsorbed on a protective agent of the colloidal particles and is not dispersed in a solvent, and it is therefore difficult to detect the metal ion, and because metal ions and colloidal particles cannot be separated with a normal filtration.

Since the metal ion itself dissolved from colloidal particles and readsorbed is hardly deemed as an impurity, there is an idea that it is not considered as a problem. However, the metal ion adsorbed on the protective agent as described above is adsorbed together with the colloidal particles to the carrier during production of a catalyst and the like to form metal particles other than the colloidal particles. This metal particles derived from the metal ion have a particle size different from that of a metal particles formed from the colloidal particles, which may influence particle size distribution of the metal particles on the carrier. Further, in the case of particles of an alloy colloid, since metals constituting the alloy are not always dissolved uniformly, compositional variation of the colloidal particles occurs due to dissolution of the metal iondissolution, and thus metal particles exhibiting performance as designed cannot be formed.

The present invention has been made based on the above-mentioned problems and provides a metal colloid solution having stability in which, in particular, temporal change of colloidal particles due to metal ion dissolution is suppressed. In addition, a method for producing the metal colloid solution is also disclosed.

Means for Solving the Problems

The present inventors have studied a factor of metal ion dissolution of the colloidal particles. As a result, the present inventors have considered that the factor is an influence of an anion derived from a metal salt used in production of the metal colloid solution. That is, metal salts such as a chloride and a nitrate are often used in production of metal colloid. When these metal salts are dissolved in a solvent, an anion such as chloride ion ($Cl^-$) and nitrate ion ($NO_3^-$) is generated in addition to the metal ion. Thereafter, a protective agent and a reducing agent are added to reduce the metal ion and then to be a metal particle, but the anion remains in the solution as it is. The present inventors have considered that since the remaining anion makes the metal particles of the colloidal particles dissolved and re-ionized, the variations in metal concentration and alloy composition of the metal colloid solution occur. Although the reaction rate of the dissolution of metal ion is not fast, the dissolution proceeds with time as long as the anion is present. Thus, as a metal colloid solution that can solve the above problems, the present inventors have conceived a metal colloid solution in which the concentration of these anions is restricted to a predetermined value or less.

That is, the present invention is a metal colloid solution comprising: colloidal particles of metal particles comprising one or two or more metal(s) and a protective agent binding to the metal particles; and a solvent as a dispersion medium of the colloidal particles, in which a chloride ion concentration per a metal concentration of 1 mass % is 25 ppm or less and a nitrate ion concentration per a metal concentration of 1 mass % is 7500 ppm or less.

In the present invention, the purpose of regulating the concentration of chloride ion and nitrate ion is to suppress dissolution of the metal particles and to prevent temporal change in metal concentration and alloy composition of the metal colloid solution. Since chlorides and nitrates are the most commonly used as a metal salt for production of a metal colloid solution, both chloride ion and nitrate ion derived from these metal salts are regulated to make a metal colloid solution having good stability.

The reason why the upper limit of the chloride ion concentration is different from that of the nitrate ion concentration is because effects (solubility) of these anions on the metal are different and because chloride ion dissolves the metal even at a low concentration while nitrate ion does not have solubility similar to that of chloride ion. And the reason why the regulation values for the concentrations of chloride ion and nitrate ion are based on the metal concentration in the metal colloid solution is because it is taken into account that the amount of chloride ion and the like generated varies depending on the amount of the raw material to be used and then the variation of the amount of the raw material also affects the metal concentration. For example, in the case of production of a platinum colloidal solution and a palladium colloidal solution having a metal concentration of 1 mass %, when chlorides (chloroplatinic acid salt, palladium chloride) are used as a raw material, 10000 ppm or more and 5500 ppm or more of chloride ions are generated, respectively. In the present invention, these are regulated to 25 ppm or less. Further, with respect to a platinum colloidal solution and a palladium colloidal solution having a metal concentration of 1 mass %, when nitrates (dinitrodiamine platinum, dinitrodiamine palladium) are used as a raw material, 15000 ppm or more and 19000 ppm or more of nitrate ions are generated, respectively. In the present invention, these are regulated to 7500 ppm or less.

In the case of a metal colloid solution of an alloy, both chloride ion and nitrate ion may be present. In this case, the concentration of these ions is lower than each criteria value. For example, in the case of producing a platinum-palladium alloy as a colloidal particle, when platinum chloride and palladium nitrate are used as raw materials, chloride ion and nitrate ion are present after colloid production, and thus it is required that the chloride ion concentration is 25 ppm or less and the nitrate concentration is 7500 ppm or less with respect to the total concentration of the platinum concentration and the palladium concentration.

The metal colloid solution according to the present invention is similar to a conventional metal colloid except that the above-described anion concentration is regulated. A preferred metal particle constituting the colloidal particle is any metal of platinum, palladium, rhodium, ruthenium, gold, silver and iridium in view of the above-described uses. Further, an alloy of these metals is also suitable.

A protecting agent similar to those in the case of a conventional metal colloid solution can be applied. The following compounds are known and applicable as a common polymer organic compound serving as a protective agent: polyvinylpyrrolidone, polyethyleneimine, polyallylamine, poly(N-carboxymethyl)allylamine, poly(N,N-dicarboxymethyl)allylamine, poly(N-carboxymethyl)ethyleneimine and the like. Among these, a particularly preferred protecting agent is polyvinylpyrrolidone (hereinafter, it may be referred to as PVP.). This is because PVP is highly water soluble and is a polymer organic compound that is particularly frequently used as a protective agent.

Further, regarding the amount of the protective agent (the amount of the protective agent with respect to the metal particles), the amount of the protective agent is not particularly limited only from the viewpoint of stability of the metal colloid solution. However, in some applications of the metal colloid solution, its adsorption property may be emphasized. For example, in catalyst production, an inorganic oxide (alumina, ceria, etc.) as a carrier is impregnated with a metal colloid solution to make colloidal particles supported on the carrier. At this point, if adsorption ability of the colloidal particles is insufficient, the colloidal particles are not supported on the carrier. In such an application, adsorption ability of the colloidal particles is important.

It is preferable that the amount of the protective agent is 0.2 to 2.5 times the mass of the metal particles as a range in which adsorption ability can be ensured under a relatively broad supporting condition (type of the inorganic oxide, etc.). When the amount of the protective agent is more than 2.5 times, even if other supporting conditions are adjusted, the amount of the protection agent is so large that adsorption ability of the colloidal particles is lowered due to steric hindrance. When the amount of the protective agent is less than 0.2 times, stability of the colloidal particles is influenced and therefore there are a risk of generating agglomeration of the metal particles in the metal colloid solution, a risk of ionization of the metal particles, and other risks. The amount of the protective agent is more preferably 0.2 to 2.0 times. In a conventional metal colloid solution, the amount of the protective agent is often set to 3.0 times or more. This is considered based on the thought that an effect of the protective agent having steric repulsion is emphasized and it is reasonable to use the protective agent in an amount equal to or more than that of the metal.

The metal concentration in the metal colloid solution is not particularly limited. However, when it is considered to efficiently make the colloidal particles supported on the carrier while stability of the metal colloid solution is considered, it is preferable that the metal concentration of the metal colloid solution is 0.01 to 8.00 mass %. As for this metal concentration, it is also acceptable that a dilute metal colloid solution is produced for taking stability during production into account and then this is concentrated to increase the metal concentration. A particularly preferred concentration is 0.1 to 4%.

In addition, as described above, for the metal colloid solution according to the present invention, the amount of the protective agent is tended to be set low in order to eliminate steric hindrance of the protective agent and to improve adsorption ability of the colloidal particles. According to the present inventors, it has been confirmed that even when the amount of the protective agent is set at such a low level, stability of the colloidal particles is not inhibited. However, in some cases such as storage of the metal colloid solution for a long time, it is desired not to worry about stability. Thus, the metal colloid solution according to the present invention additionally has a protective agent not binding to the metal, and thereby it is possible to ensure stability of the solution. The protective agent added in this way does not bind to the colloidal particles even in the metal colloid solution, and acts as a buffer for preventing aggregation as it is.

With respect to the amount of the protective agent additionally existing in the metal colloid solution, when the amount of the protective agent binding to the metal in the metal colloidal particles is 0.2 to 2.5 times (more preferably 0.2 to 2.0 times) the mass of the metal particles as described above, it is preferable that the protective agent that does not bind to the metal particles is set to 0.1 to 2.8 times the mass of the metal particles. The metal colloid solution to which the protective agent is thus added can be used for catalyst production and the like.

Next, the method of producing the metal colloid solution according to the present invention will be explained. The production method according to the present invention is based on a step of forming colloidal particles with addition of one or more metal salts, a protective agent and a reducing agent in a solvent. This is similar to a conventional method of producing the metal colloid solution, but the producing method according to the present invention is characterized by comprising a subsequent removal step (desalting treatment, denitration treatment: hereinafter referred to as a stabilization treatment step) for decreasing the concentration of chloride ion and the like. The step of forming colloidal particles is first explained in detail below.

The colloidal particle forming step is a step of reducing metal ions in a solvent and also binding a protection agent to metal particles. Water is preferred as a solvent, but an organic solvent or a mixed solvent of water with an organic solvent can be also applied. Metal salts as a raw material of the metal colloids are described below. The following are applicable as a metal salt for producing a platinum colloid: hexachloroplatinic acid, dinitrodiammine platinum, dinitrodiammine platinum nitrate, platinum (II and IV) chloride, chloroplatinic acid, chloroplatinic acid salts and the like. The following are applicable as a metal salt for producing a palladium colloid: palladium chloride, palladium nitrate, dinitrodiamine palladium and the like. Chloroauric acid, chloroauric acid salts and the like are applicable as a metal salt for producing a gold colloid. Silver chlorate, silver nitrate and the like are applicable as a metal salt for producing a silver colloid. Ruthenium chloride and ruthenium nitrate are applicable as a metal salt for producing a ruthenium colloid. Rhodium chloride, rhodium nitrate and the like are applicable as a metal salt for producing a rhodium colloid. Hexachloroiridic acid, iridium trichloride and the like are applicable as a metal salt for producing an iridium colloid. And in the case of producing a multi-component metal alloy colloid consisting of a plurality of metals, its production is possible with dissolution of the above-described metal salts in a solvent at the same time.

As for the protecting agent, the above-described various polymer organic compounds are applied. Also, it is possible to apply a reducing agent used in a conventional colloid production. For example, the following reducing agents can be applied: formic acid; alcohol such as ethanol, methanol, propanol and butanol; glycols such as ethylene glycol; hydrogen, sodium borohydride, hydrazine, dimethylamine borane and trimethylamine borane.

Further, in the case of producing an alloy colloid, reduction of constituent metals may be carried out at the same time or stepwise. For example, in production of a two-component metal colloid (Pt—Pd alloy), both metal salts (Pt salt and Pd salt), a reducing agent and a protective agent may be mixed in a solvent. Meanwhile, the following steps may be used: first, one of the metal salts (Pt salt), a reducing agent and a protective agent are mixed to form metal colloidal particles of the one, to which the other metal salt (Pd salt) and a reducing agent are added for alloying.

The present invention has a stabilization treatment step for decreasing a chloride ion concentration after forming of the colloidal particles. First, the content of the stabilization treatment step is removal of an anion with ultrafiltration. The reason for using ultrafiltration is that an anion cannot be removed with normal filtration. It is preferable that a filtration membrane of the ultrafiltration has a molecular weight cutoff of 5000 to 40000. Further, it is preferable that a condition of the filtration is to apply pressure at approximately 4 atm with an inert gas such as nitrogen and argon.

The second step of the stabilization treatment step is a step in which alkali is added to a solution after formation of the colloidal particles. This alkali addition is intended to decrease the total concentration of the chloride ion or the like with neutralization of the chloride ion or the like to form a salt. The alkali to be added is preferably ammonia, sodium hydroxide, lithium hydroxide, potassium hydroxide, sodium carbonate, lithium carbonate, potassium carbonate, calcium hydroxide, and hydroxytetramethyl ammonium. The amount of the alkali to be added can be determined with calculation of the total amount of chloride ion and/or nitrate ion contained in the metal salt used during production of the metal colloid solution.

The solution after the addition of alkaline can be used as a metal colloid solution as it is. Further, it is possible that this solution is filtered to collect colloidal particles that are then redispersed in a solvent to make a metal colloid solution.

As the third step of the stabilization treatment step, a step in which a metal colloid solution is subjected to centrifugation to generate precipitation and the metal colloid solution is decanted is also applicable.

The condition of this centrifugation step is a rotation rate of 5000 to 8000 rpm for 5 to 10 minutes. Under this condition, the metal colloid solution is rotated to precipitate colloidal particles. Then, after the supernatant is removed from the system while the precipitate is left, a solvent is added to the precipitate, and the concentration is adjusted while the colloidal particles are redispersed, and thereby a metal colloid solution can be made.

Further, as the stabilizing treatment step and as an effective method for removing nitrate ion, its decomposition and removal step is also useful. In the method of decomposing nitrate ion, various kinds of energy such as heat, microwave, ultrasound and plasma are imparted to the metal colloid solution. Specifically, for example, as a method for imparting thermal energy, a metal colloid solution is heated at a temperature (100 to 120° C.) in the vicinity of its boiling point for 4 to 15 hours. Then, with evacuation while the solution being boiled, it is possible to decompose and degas nitrate ion in the solution to decrease the nitrate ion concentration.

With the producing step described above, a metal colloid solution with decreased chloride ion and the like can be produced. Further, the metal colloid solution produced in this manner may be subjected to separation operation such as filtration to collect colloidal particles that are then redispersed in an appropriate solvent to make a metal colloid solution.

Effect of the Invention

As described above, the metal colloid solution according to the present invention has stability over a long period with reduced changes over time in metal concentration or composition. According to the present invention, a metal and/or an alloy having a designed amount of a metal and elementary composition can be fixed to an appropriate support during production of a functional material such as a catalyst.

DETAILED DESCRIPTION OF THE PREFERRED EMBODIMENTS

Preferred embodiments of the present invention will be described below. In the present embodiment, various metal colloid solutions were produced, and their stability was evaluated. In addition, for the metal colloid solutions, the adsorption property onto the inorganic oxide carrier was also evaluated.

Various metal colloid solutions were prepared according to similar steps. That is, a metal salt solution comprising a one or more metal salts was provided, to which a protective agent solution with a protective agent dissolved was added, and then a reducing agent was added and the mixture was refluxed at 100° C. for 2 hours to make a metal colloid solution. Then, after treatment for removing chloride ion or nitrate ion in the metal colloid solution, the treated solution was concentrated with heating to afford a metal colloid solution having an increased metal concentration.

The chloride ion or nitrate ion removal treatment was performed with selection of the following kinds of treatment:

a. Ultrafiltration: The metal colloid solution is passed through an ultrafiltration filter of 10000 molecular weight cutoff to remove the chloride ion.

b. Centrifugation: After 10% by volume of methanol was added to the metal colloid solution, centrifugation was performed at a rotation rate of 6000 rpm for 5 minutes, and the supernatant was removed with decantation, and then water was added to the precipitate to adjust the colloid concentration.

c. Heat treatment: For the metal colloid solution produced after the heating reflux treatment (100° C., 2 hours) in which a reducing agent was added, the heat refluxing treatment was continued for 10 hours as it was to decompose and remove nitrate ion.

d. Alkali addition: Ammonia was added to the metal colloid solution until the pH became 5 to 7 with pH meter measurement.

Table 1 shows the metal colloid solutions produced in the present embodiment.

TABLE 1

| | Metal colloid | Metal salt | Protective agent Type | Amount of protective agent | Desalting/ Denitration treatment | Final metal concentration |
|---|---|---|---|---|---|---|
| Example 1 | Pd7—Pt3 | Palladium nitrate Chloroplatinic acid | PVP | 1.0 | a | 4 wt % |
| Example 2 | Pd | Palladium chloride | | 2.0 | a | 4 wt % |
| Example 3 | Pt | Chloroplatinic acid | | 0.2 | b | 4 wt % |
| Example 4 | Pd1—Pt1 | Palladium chloride Chloroplatinic acid | | 1.0 | a | 2 wt % |
| Example 5 | Pd | Palladium nitrate | | 1.5 | c | 4 wt % |
| Example 6 | Pt | Dinitrodiamine platinum | | 0.2 | d | 4 wt % |
| Example 7 | Au | Chloroauric acid | | 1.0 | a | 2 wt % |
| Example 8 | Rh | Rhodium nitrate | | 1.5 | c | 4 wt % |
| Example 9 | Ru | Ruthenium nitrate | | 0.2 | d | 4 wt % |
| Example 10 | Pt | Chloroplatinic acid | | 2.0 | b | 4 wt % |
| Example 11 | Ag | Silver nitrate | | 2.0 | d | 4 wt % |
| Example 12 | Ir | Iridium chloride | | 1.0 | a | 2 wt % |
| Example 13 | Pd1—Ag1 | Palladium nitrate Silver nitrate | | 1.5 | c | 4 wt % |
| Comparative Example 1 | Pd7—Pt3 | Palladium nitrate Chloroplatinic acid | PVP | 5.0 | None | 2 wt % |
| Comparative Example 2 | Pd | Palladium chloride | | 3.0 | | 4 wt % |
| Comparative Example 3 | Pt | Chloroplatinic acid | | 1.0 | | 4 wt % |
| Comparative Example 4 | Pd | Palladium nitrate | | 1.5 | | 4 wt % |
| Comparative Example 5 | Au | Chloroauric acid | | 3.0 | | 4 wt % |
| Comparative Example 6 | Rh | Rhodium nitrate | | 5.0 | | 4 wt % |
| Comparative Example 7 | Ru | Ruthenium nitrate | | 3.0 | | 4 wt % |
| Comparative Example 8 | Ag | Silver nitrate | | 2.0 | | 4 wt % |
| Comparative Example 9 | Ir | Iridium chloride | | 3.0 | | 2 wt % |
| Comparative Example 10 | Pd1—Ag1 | Palladium nitrate Silver nitrate | | 3.0 | | 4 wt % |

In Example 1 and Comparative Example 1, Alloy of Pd:Pt = 7:3; In Example 4, Alloy of Pd:Pt = 1:1;
In Example 13 and Comparative Example 10, Alloy of Pd:Ag = 1:1.
a: Ultrafiltration
b: Decantation
c: Heating decomposition
d: Ammonia addition
Amount of protective agent represents the mass ratio of PVP to the metal weight.

For each of the produced metal colloid solutions, it was first examined whether dissolution of the colloidal particles and precipitation generation were present or not as a stability evaluation. In this stability evaluation test, for the metal colloid solutions after production, the colloidal solution was sampled at each predetermined period (the day of production, 1 day, 7 days, 30 days later), and then 100 mL of the solution was put in an ultrafiltration device (10000 molecular weight cutoff) and filtered under pressure with Ar gas of 4 atm. Then, the filtrate was subjected to ICP analysis to calculate a proportions of dissolved metal ions (the amount of metal charged, by mass). Further, the precipitation generation was determined based on whether precipitation remained on the filter paper or not after the sampled solution was filtered through a membrane filter having a pore size of 0.2 μm. The results of this evaluation are shown in Table 2.

although there was a difference in degree, dissolution of the metal ions occurred. It is considered that the precipitate formed in the Pt colloid of Comparative Example 3 is derived from the metal of the colloidal particle, and this is considered because the quantity of the protective agent was relatively small under a circumstance of extremely high chloride ion concentration. Optimization of the amount of the protective agent is considered to be required in view of the results of the after-mentioned confirmation test on an effect of improving the adsorption property. However, it is believed that the decrease in the anion concentration must be given priority.

Then, in the adsorption property evaluation test, a solution in such an amount that the metal content was 0.05 g was collected from each of the metal colloid solutions, and 500 mL of purified water was added thereto. Then, this metal

TABLE 2

| | Metal colloid | Desalting/ Denitration treatment | Anion concentration (ppm) | | Metal dissolution rate, Presence of precipitation | | | |
| --- | --- | --- | --- | --- | --- | --- | --- | --- |
| | | | Chloride ion concentration | Nitrate ion concentration | Manufacturation day | After 1 day | After 7 days | After 30 days |
| Example 1 | Pd7—Pt3 | a | 4 | 420 | ND | ND | ND | ND |
| Example 2 | Pd | a | 3 | ND | ND | ND | ND | ND |
| Example 3 | Pt | b | 23 | ND | ND | ND | ND | ND |
| Example 4 | Pd1—Pt1 | a | 2 | ND | ND | ND | ND | ND |
| Example 5 | Pd | c | ND | 7230 | ND | ND | ND | ND |
| Example 6 | Pt | d | ND | 2850 | ND | ND | ND | ND |
| Example 7 | Au | a | 5 | ND | ND | ND | ND | ND |
| Example 8 | Rh | c | ND | 7410 | ND | ND | ND | ND |
| Example 9 | Ru | d | ND | 2090 | ND | ND | ND | ND |
| Example 10 | Pt | b | 21 | ND | ND | ND | ND | ND |
| Example 11 | Ag | d | ND | 2020 | ND | ND | ND | 0.02% |
| Example 12 | Ir | a | 3 | ND | ND | ND | ND | ND |
| Example 13 | Pd1—Ag1 | c | ND | 2650 | ND | ND | ND | ND |
| Comparative Example 1 | Pd7—Pt3 | None | 540 | 17840 | ND | 0.10% | 0.45% | 0.63% |
| Comparative Example 2 | Pd | | 5850 | ND | ND | 0.12% | 0.52% | 0.82% |
| Comparative Example 3 | Pt | | 10810 | ND | ND | ND | Precipitation generation | Precipitation generation |
| Comparative Example 4 | Pd | | ND | 18880 | ND | 0.11% | 0.51% | 0.76% |
| Comparative Example 5 | Au | | 7290 | ND | ND | ND | 0.01% | 0.03% |
| Comparative Example 6 | Rh | | ND | 22060 | ND | 0.03% | 0.04% | 0.07% |
| Comparative Example 7 | Ru | | ND | 19580 | ND | 0.05% | 0.08% | 0.25% |
| Comparative Example 8 | Ag | | ND | 15020 | 1.05% | 2.52% | 5.63% | 12.30% |
| Comparative Example 9 | Ir | | 7860 | ND | ND | 0.01% | 0.05% | 0.12% |
| Comparative Example 10 | Pd1—Ag1 | | ND | 12250 | 0.95% | 2.33% | 4.24% | 8.45% |

In Example 1 and Comparative Example 1, Alloy of Pd:Pt = 7:3;
In Example 4, Alloy of Pd:Pt = 1:1;
In Example 13 and Comparative Example 10, Alloy of Pd:Ag = 1:1.
a: Ultrafiltration
b: Decantation
c: Heating decomposition
d: Anmmonia addition
ND: Not detected
Anion concentration represents a concentration of 1 mass % of the metal.

It has been found from Table 2 that in the metal colloid solution of Examples 1 to 13 in which various kinds of desalting and denitration treatment were performed, dissolution of the metal ions scarcely occurred and precipitation generation was not observed even 30 days later, and thus the metal colloid solution had excellent stability. It is considered that this result is due to the decrease in chloride ion and nitrate ion with the stabilization treatment. Meanwhile in the respective Comparative Examples, it can be confirmed that colloid solution was stirred for 5 minutes, and 5 g of each of various inorganic oxide carriers was added thereto (when the all amount of the metal is adsorbed, the supporting amount is 1 mass %.). The pH of the solution was 5 to 7 at this point. After addition of the inorganic oxide, the solution was stirred for 2 hours and then was suction-filtered through a filter paper of 5C of the JIS standard. The filtrate was subjected to ICP analysis to measure metal concentrations, and an adsorption rate per 2 hours which was a duration of stirring was calculated (taken as 100 mass % when all amount of the charged metal is supported). Table 3 shows the results.

TABLE 3

| | Metal colloid | Amount of protective agent PVP/Metal | Adsorption rate (%) | | | |
|---|---|---|---|---|---|---|
| | | | Titania | Zirconia | Alumina | Ceria |
| Example 1 | Pd7—Pt3 | 1.0 | 100 | 100 | 100 | 100 |
| Example 2 | Pd | 2.0 | 100 | 100 | 100 | 100 |
| Example 3 | Pt | 0.2 | 100 | 100 | 100 | 100 |
| Example 4 | Pd1—Pt1 | 1.0 | 100 | 100 | 100 | 100 |
| Example 5 | Pd | 1.5 | 100 | 100 | 100 | 100 |
| Example 6 | Pt | 0.2 | 100 | 100 | 100 | 100 |
| Example 7 | Au | 1.0 | 100 | 100 | 100 | 100 |
| Example 8 | Rh | 1.5 | 100 | 100 | 100 | 100 |
| Example 9 | Ru | 0.2 | 100 | 100 | 100 | 100 |
| Example 10 | Pt | 2.0 | 100 | 96 | 92 | 89 |
| Example 11 | Ag | 2.0 | 100 | 100 | 100 | 100 |
| Example 12 | Ir | 1.0 | 100 | 100 | 100 | 100 |
| Example 13 | Pd1—Ag1 | 1.5 | 100 | 100 | 100 | 100 |
| Comparative Example 1 | Pd7—Pt3 | 5.0 | 74 | 42 | 34 | 30 |
| Comparative Example 2 | Pd | 3.0 | 84 | 74 | 65 | 54 |
| Comparative Example 3 | Pt | 1.0 | 64 | 49 | 44 | 42 |
| Comparative Example 4 | Pd | 1.5 | 93 | 95 | 93 | 90 |
| Comparative Example 5 | Au | 3.0 | 80 | 77 | 63 | 61 |
| Comparative Example 6 | Rh | 5.0 | 66 | 45 | 33 | 29 |
| Comparative Example 7 | Ru | 3.0 | 91 | 82 | 85 | 70 |
| Comparative Example 8 | Ag | 2.0 | 82 | 75 | 70 | 64 |
| Comparative Example 9 | Ir | 3.0 | 69 | 61 | 54 | 44 |
| Comparative Example 10 | Pd1—Ag1 | 3.0 | 88 | 78 | 72 | 63 |

In Example 1 and Comparative Example 1, Alloy of Pd:Pt = 7:3;
In Example 4 Alloy of Pd:Pt = 1:1;
In Example 13 and Comparative Example 10, Alloy of Pd:Ag = 1:1.
Amount of protective agent represents the mass ratio of PVP to the metal weight.

From Table 3, it is found that the amount of the protective agent (the mass of the protective agent to that of the metal) affects the adsorption performance of the metal colloid. In the metal colloids of Examples 1 to 13, the amount of the protective agent is set to 2.0 times or less, and the metal colloid is adsorbed on all of the inorganic oxide carriers at the adsorption rate of 100%. Comparative Examples 1 to 7 mainly involve the colloids having a relatively large amount of the protective agent, and the adsorption rate is low. In Comparative Example 3, the adsorption rate was low in spite of a small amount of the protective agent and it is considered because the precipitation generation was observed as described above. Also in Comparative Example 8, despite a small amount of the protective agent, the dissolution amount of the metal dissolved is large because of nitrate ion and thus it is considered that the adsorption rate was measured lower. From the above, it is understood that it is preferable to pay attention to the amount of protective agent as well as a decrease in amount of chloride ion and the like in the solution in order to make a metal colloid solution having excellent adsorptive property in addition to stability.

INDUSTRIAL APPLICABILITY

As described above, the metal colloid solution according to the present invention has excellent stability and the metal composition of the colloidal particles changes only a little bit even after long period of time. Further, the present invention can improve the adsorption ability for various carriers with adjustment of the amount of the protective agent. Because of these properties, the present invention is useful for producing a material such as a catalyst that requires strict adjustment of the composition.

What is claimed is:

1. A metal colloid solution for producing a catalyst having an inorganic oxide as a carrier, said metal colloid solution consisting of: colloidal particles comprising metal particles of one or more metals and a protective agent consisting of polyvinylpyrrolidone bound to the metal particles; and a solvent as a dispersion medium of the colloidal particles, wherein: a concentration of the metal in the solution is 0.01 to 8.0 mass %, and wherein the protective agent bound to the metal particles is present in the metal colloid solution in an amount from 0.2 to 1.0 times a mass of the metal particles to adsorb the colloidal particles to the inorganic oxide; a chloride ion concentration per metal concentration of 1 mass % is 25 ppm or less; and a nitrate ion concentration per metal concentration of 1 mass % is 7500 ppm or less.

2. The metal colloid solution according to claim 1, wherein the metal particles comprise one or more metals of platinum, palladium, rhodium, ruthenium, gold, silver and iridium.

3. A method of producing the metal colloid solution defined in claim 2, comprising: a step of adding one or more metal salts, a protective agent and a reducing agent to a solvent to form colloidal particles to produce the metal colloid solution; and a stabilization treatment step for removing chloride ion and/or nitrate ion in the metal colloid solution.

4. The method of producing the metal colloid solution according to claim 3, wherein the stabilization treatment step includes a step of subjecting the metal colloid solution to ultrafiltration.

5. The method of producing the metal colloid solution according to claim 3, wherein the stabilization treatment step includes a step of adding alkali to the metal colloid solution.

6. The method of producing the metal colloid solution according to claim 3, wherein the stabilization treatment step includes a step of centrifuging the metal colloid solution to form precipitates and decanting the metal colloid solution.

7. The method of producing the metal colloid solution according to claim 3, wherein the stabilization treatment step includes a step of removing nitrate ion in the metal colloid solution wherein energy of heat, microwave, ultrasound, plasma is imparted to the metal colloid solution to decompose nitrate ion.

8. A method of producing a metal colloid solution for producing a catalyst having an inorganic oxide as a carrier, said metal colloid solution comprising: colloidal particles comprising metal particles of one or more metals and a protective agent consisting of polyvinylpyrrolidone bound to the metal particles; and a solvent as a dispersion medium of the colloidal particles, wherein: a concentration of the metal in the solution is 0.01 to 8.0 mass %, and wherein the protective agent bound to the metal particles is present in the metal colloid solution in an amount from 0.2 to 1.0 times a mass of the metal particles to adsorb the colloidal particles to an inorganic oxide; a chloride ion concentration per metal concentration of 1 mass % is 25 ppm or less; and a nitrate ion concentration per metal concentration of 1 mass % is 7500 ppm or less, said method comprising:

a step of adding one or more metal salts, a polyvinylpyrrolidone protective agent and a reducing agent to a solvent to form colloidal particles to produce the metal colloid solution; and a stabilization treatment step for removing chloride ion and/or nitrate ion in the metal colloid solution;

wherein the polyvinylpyrrolidone protective agent is 0.2 to 1.0 times the mass of metal in the metal salt, and wherein the reducing agent is an alcohol, a glycol, hydrogen, sodium borohydride, hydrazine, or dimethylamine borane.

9. The method of producing the metal colloid solution according to claim 8, wherein the stabilization treatment step includes a step of subjecting the metal colloid solution to ultrafiltration.

10. The method of producing the metal colloid solution according to claim 8, wherein the stabilization treatment step includes a step of adding alkali to the metal colloid solution.

11. The method of producing the metal colloid solution according to claim 8, wherein the stabilization treatment step includes a step of centrifuging the metal colloid solution to form precipitates and decanting the metal colloid solution.

12. The method of producing the metal colloid solution according to claim 8, wherein the stabilization treatment step includes a step of removing nitrate ion in the metal colloid solution wherein energy of heat, microwave, ultrasound, plasma is imparted to the metal colloid solution to decompose nitrate ion.

13. A method according to claim 8, wherein the metal colloid solution comprises metal particles which comprise one or more metals of platinum, palladium, rhodium, ruthenium, gold, silver and iridium.

14. A metal colloid solution produced according to the method of claim 9.

15. A metal colloid solution produced according to the method of claim 12.

* * * * *